United States Patent [19]

Smith

[11] Patent Number: 5,136,417
[45] Date of Patent: Aug. 4, 1992

[54] OPTICAL SYSTEM

[75] Inventor: Brian F. Smith, Essex, United Kingdom

[73] Assignee: GEC-Marconi Limited, Stanmore, United Kingdom

[21] Appl. No.: 711,383

[22] Filed: Jun. 6, 1991

Related U.S. Application Data

[63] Continuation of Ser. No. 422,818, Oct. 19, 1989, abandoned.

[51] Int. Cl.$^5$ .................. G02B 26/08; G02B 17/00
[52] U.S. Cl. .................. 359/217; 359/205; 359/837; 250/236
[58] Field of Search .................. 350/6.1–6.9, 350/6.91, 286, 174, 3.7, 433, 436, 447; 250/234–236; 358/206, 481, 474; 359/833, 837

[56] References Cited

U.S. PATENT DOCUMENTS

| | | | |
|---|---|---|---|
| 3,720,454 | 3/1973 | Inderhees | 350/285 |
| 4,084,881 | 4/1978 | Hirabayashi et al. | 350/6.8 |
| 4,176,907 | 12/1979 | Matsumoto et al. | 350/6.8 |
| 4,196,961 | 4/1980 | Walter et al. | 350/6.8 |
| 4,210,810 | 7/1980 | Berry et al. | 250/347 |
| 4,268,110 | 5/1981 | Ford | 350/6.7 |
| 4,293,186 | 10/1981 | Offner | 350/432 |
| 4,395,095 | 7/1983 | Horton | 350/504 |
| 4,412,723 | 11/1983 | Shafer | 359/737 |
| 4,743,112 | 5/1988 | Burke | 359/727 |
| 4,832,429 | 5/1989 | Nagler | 350/446 |
| 5,032,014 | 7/1991 | Toga | 359/737 |

FOREIGN PATENT DOCUMENTS

| | | |
|---|---|---|
| 0256826 | 8/1987 | European Pat. Off. |
| 1567319 | 11/1976 | United Kingdom |
| 1581183 | 3/1977 | United Kingdom |
| 2151038A | 11/1984 | United Kingdom |
| 2187301A | 2/1986 | United Kingdom |

Primary Examiner—Rodney B. Bovernick
Assistant Examiner—James Phan
Attorney, Agent, or Firm—Lowe, Price LeBlanc & Becker

[57] ABSTRACT

A scanning thermal imager includes means to compensate for a degree of undesirable asymmetry introduced by an element such as a spherical lens operating in an off axis manner. The means can advantageously include an optical element mounted in the optical path with at least one main face at an angle other than normal to the path and arranged to introduce a desired degree of compensating asymmetry.

8 Claims, 2 Drawing Sheets

OPTICAL SYSTEM

This application is a continuation of application Ser. No. 07/422,818 filed Oct. 19, 1989, now abandoned.

BACKGROUND OF INVENTION

This invention relates to an optical system. In particular, but not exclusively it relates to an optical system forming part of a thermal imager of the type comprising a telescope and a scanning system for scanning the field of view and directing radiation from the field of view onto a cryogenically cooled detector.

In the past, scanning systems used in such thermal imagers have employed a series of mirrors to give a compact design. Part of a typical imaging system is shown in FIG. 1 and comprises a scanning polygon which scans the field of view in a horizontal direction, a frame mirror which scans the field of view in a verical direction, and a relay system including a relay mirror which is, of necessity, operated off axis so that radiation may be directed ultimately to a cryogenically cooled detector. The relay mirror is used to image the entrance pupil onto the frame mirror to facilitate the scanning function.

However, the use of a spherical relay mirror, that is, a mirror having only one radius of curvature, introduces a degree of asymmetry due to the requirement to operate it in such an off axis manner, which introduces aberrations into the system. To avoid such aberrations it is possible to replace the spherical relay mirror with a mirror having two mutually orthogonal radii of curvature. Such a mirror is commonly called a toric mirror since its surface may be considered to be a portion of the inner surface of a torus. Due to the radius in the horizontal plane, the mirror is able to reflect radiation onto the line mirror without introducing substantial aberrations.

The use of a torical mirror does however have some disadvantages. Toric mirrors are expensive to manufacture due to their complex surface curvature. Further, they are commonly made by diamond turning techniques which result in very fine scratching of the reflective surface. These fine scratches act as an optical grating and thus introduce further aberrations and scatter.

BRIEF SUMMARY OF THE INVENTION

According to the present invention there is provided an optical system including: one or more elements which are disposed in such a manner as to introduce a degree of undesired asymmetry, and means for compensating optically for the asymmetry.

Preferably the aberration introducing element is an element having one radius of curvature and is operated in an off-axis manner and the compensating means includes one or more further elements mounted in an optical path of the system.

Thus, apparatus according to the invention avoids the need for expensive toric mirrors by employing spherical mirrors and compensating for the aberrations inherent in their use by introducing a compensating degree of axial asymmetry using optical means.

Preferably the element of elements have at least one face at an angle other than normal to the optical path.

The element may be planar with parallel main faces or alternatively may be a prism.

The invention may be advantageously employed in an imaging system as described above and is preferably adapted for use in a scanning imager.

In a second aspect the invention provides a method for improving the performance of an optical system by introduction of a degree of asymmetry.

BRIEF DESCRIPTION OF THE DRAWING

Embodiments of the invention will now be described by way of example only with reference to the accompanying drawings, in which.

DESCRIPTION OF PREFERRED EMBODIMENTS

Figure 1:
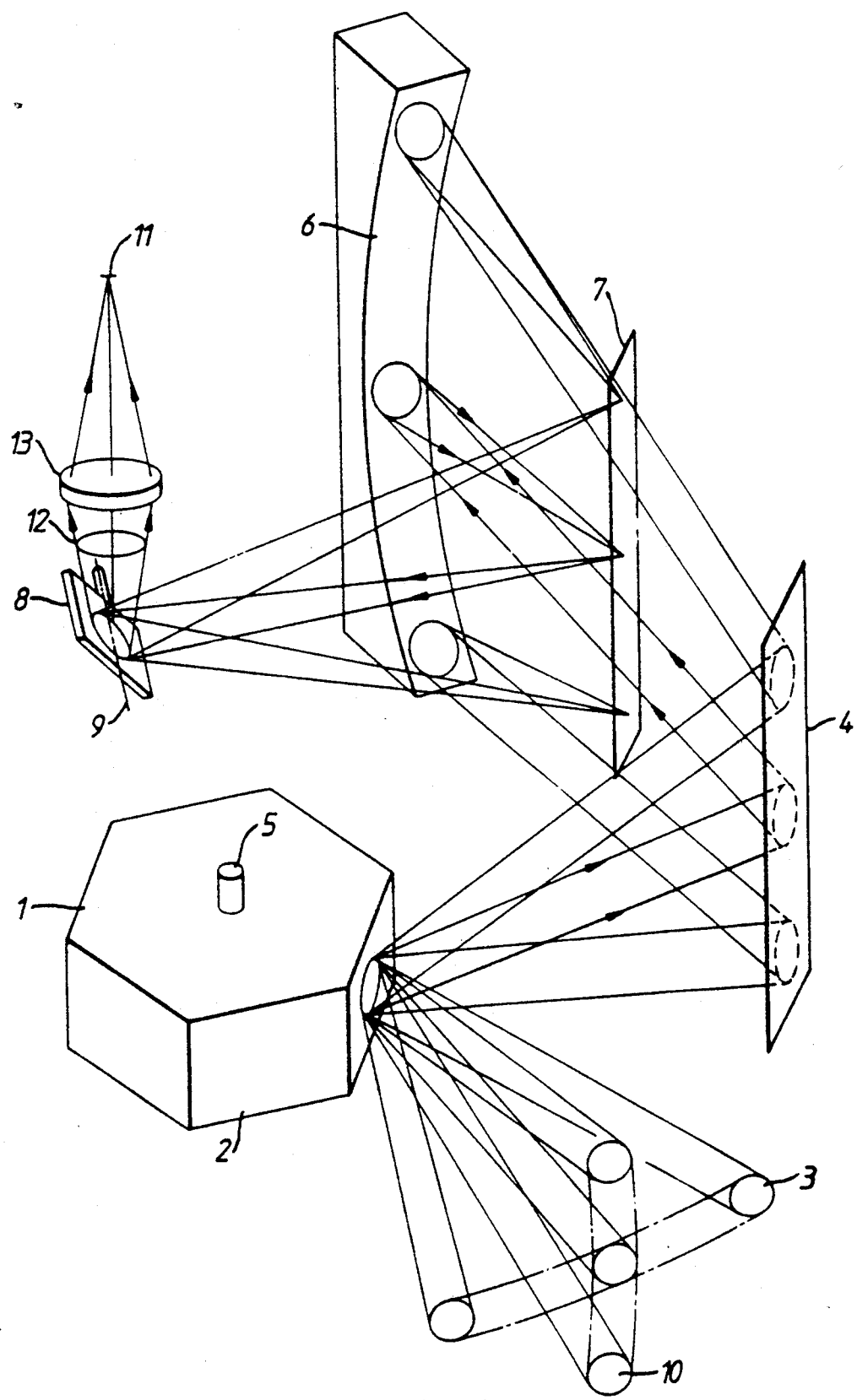
FIG. 1. shows schematically part of a thermal imager.

The functioning of a thermal imaging system will now be described with reference to FIG. 1. A telescope system (not shown) passes radiation from a scene to be viewed to a rotating polygon 1 which rotates about an axis 5. The speed of rotation may be many hundreds of revolutions per minute and each side of polygon 2 scans the field of view in a horizontal direction to give a line scan 3. The sides 2 are flat and manufactured to be highly reflective and reflect the radiation to a bend mirror 4. The bend mirror 4 allows for a long optical path length within a compact design and reflects the radiation to a relay mirror 6. This is a spherical mirror and has to be operated in an off axis manner in order to reflect the radiation from the bend mirror to the line mirror 7. This is positioned in a different plane to that common to the mirrors so as not to obstruct the path of radiation between the bend mirror 4 and the relay mirror 6. In order that the full extent of the scan may be processed by a detector 11 of modest size the relay mirror 6 is curved to give a scan focusing effect. The radiation is reflected by the line mirror 7 onto a frame mirror 8 which is adapted to scan vertically about an axis 9. In this way the field of view is scanned in the vertical direction to give a frame scan 10. A stop 12 serves to define the numerical aperture of the system and a lens 13 serves to focus the field of view onto the detector 11.

However, in order to compensate for the degree of undesirable asymmetry introduced by the spherical relay mirror 6, compensating elements are introduced into the system. Conveniently they are introduced between frame mirror 8 and the detector 11. Most conveniently they are positioned between the lens 13 and the detector 11. They may however be positioned anywhere between the relay mirror 6 and detector 11 and can be employed when the beam is not parallel.

Figure 2:
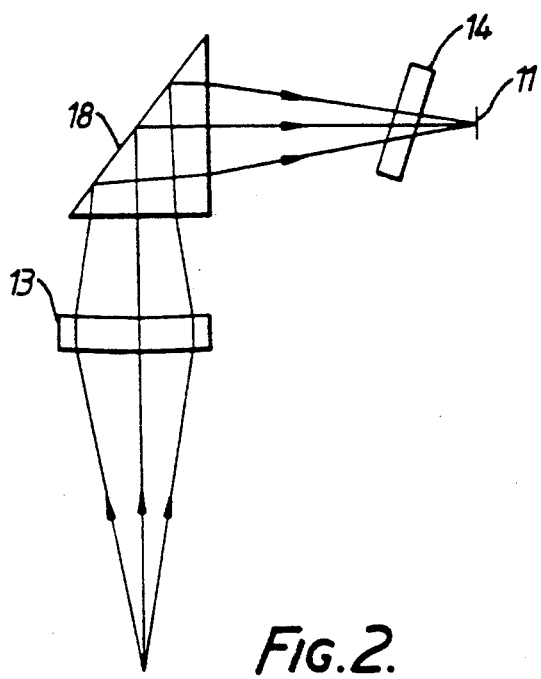
FIG. 2. shows an angled parallel plate element for compensating for an undesirable asymmetry.

FIGS. 2 to 5 show part of the imager in greater detail with the addition of aberration compensation elements. FIG. 2 shows that the necessary degree of compensating asymmetry may be introduced by placing a parallel plate element 14 before the detector 11. A prism is normally included in such designs so as to provide a long optical path in a compact design and to achieve the desired configuration.

Figure 3:
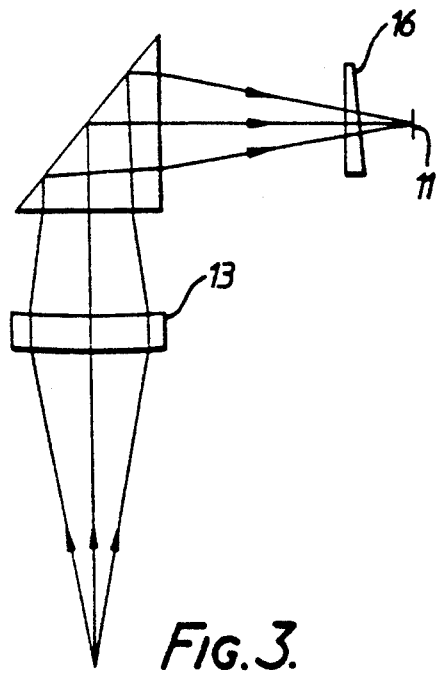
FIG. 3. shows an aberration correction arrangement including an element in the form of a wedged plate.

This parallel plate 14 is arranged at such an angle that it precisely compensates for the asymmetry introduced by the spherical relay mirror shown in FIG. 1. The degree of compensation required and hence the angle at which the plate must be placed are easily obtainable by known methods, for example by a ray tracing program of the type commercially available for personal computers, or indeed by simply observing the image and altering the angle until aberrations are at a minimum. FIG. 3 shows that correction may be achieved by using a wedged plate 16 in a similar manner. The wedge nature of the plate is shown exaggerated in the figure.

Figure 4:
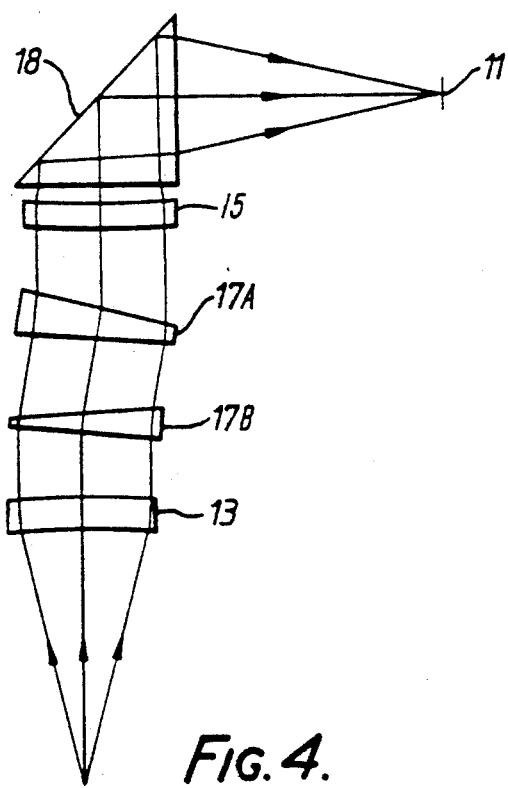
FIG. 4. shows an aberration correction arrangement comprising a plurality of prisms.

FIG. 4 shows an anamorphic detector lens, i.e. one having different horizontal and vertical focal lengths. This is achieved by introducing two prisms 17a and 17b into the optical path. The faces of prisms 17a and 17b may be further angled to introduce the desired correcting assymetry. A lens 15 is required in the optical path to ensure convergence of the image between prisms 17a and 17b, and detector 11.

Figure 5:
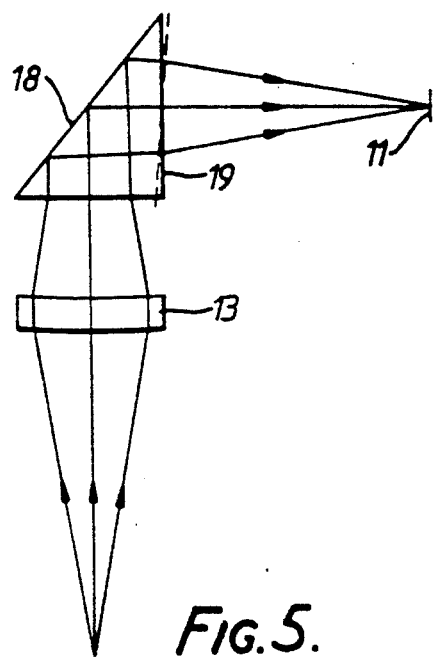
FIG. 5. shows an aberration correction arrangement comprising a prism having faces not normal to the direction of propagation of radiation incident on the detector.

FIG. 5 shows that correction may be achieved by angling the face 19 of the prism 18 so that it is not normal to the optical axis of the rest of the system so introducing the necessary degree of asymmetry to compensate for that introduced by the spherical relay mirror 6.

Such a correction of optical asymmetry may find applications in optical systems other than scanning imaging systems and particularly in systems where physical constraints require the operation of elements in an off axis manner. It will be appreciated that many different configurations of lenses, mirrors or other optical elements can be used to achieve the required optical correction.

We claim:

1. An optical system comprising:
    means for introducing radiation from a field of view into the system along an optical path;
    a spherical focussing element positioned in said optical path in an off axis manner, said element introducing asymmetric aberrations into said optical path;
    a further optical element means positioned in said optical path for compensating for the undesired asymmetric aberrations in said optical path with only plane surfaces, said aberrations being caused by said spherical focussing element positioned in said path in an off axis manner; and
    means for directing radiation from said system to a detector.

2. An optical system as claimed in claim 1 wherein said element means defines at least one main face at an angle other than normal to the optical path.

3. An optical system as claimed in claim 2 wherein said element means has parallel main faces.

4. An optical system as claimed in claim 2 wherein the element means is a prism.

5. An imager including:
    means for introducing radiation from a field of view into the system along an optical path;
    a spherical focussing element positioned in said optical path in an off axis manner, said element introducing asymmetric aberrations into said optical path;
    a further optical element means positioned in said optical path for compensating for the undesired asymmetric aberrations in said optical path with only plane surfaces, said aberrations being caused by said spherical focussing element positioned in said path in an off axis manner; and
    means for directing radiation from said system to a detector said element means being disposed between said focussing element and detector.

6. An imager as claimed in claim 5 further including a scanning mirror in the optical path whereby said imager can be used as a scanning imager.

7. An imager as claimed in claim 6 including a frame mirror and one or more detectors and wherein said further optical element means is disposed between said frame mirror and said detector.

8. An imager as claimed in claim 7 further including a lens interposed between said frame mirror and detector and wherein said further optical element means is disposed between said lens and said detector.

* * * * *